(No Model.) 2 Sheets—Sheet 1.
A. O. BABENDREIER.
CONDUIT SYSTEM FOR ELECTRIC RAILWAYS.
No. 580,246. Patented Apr. 6, 1897.
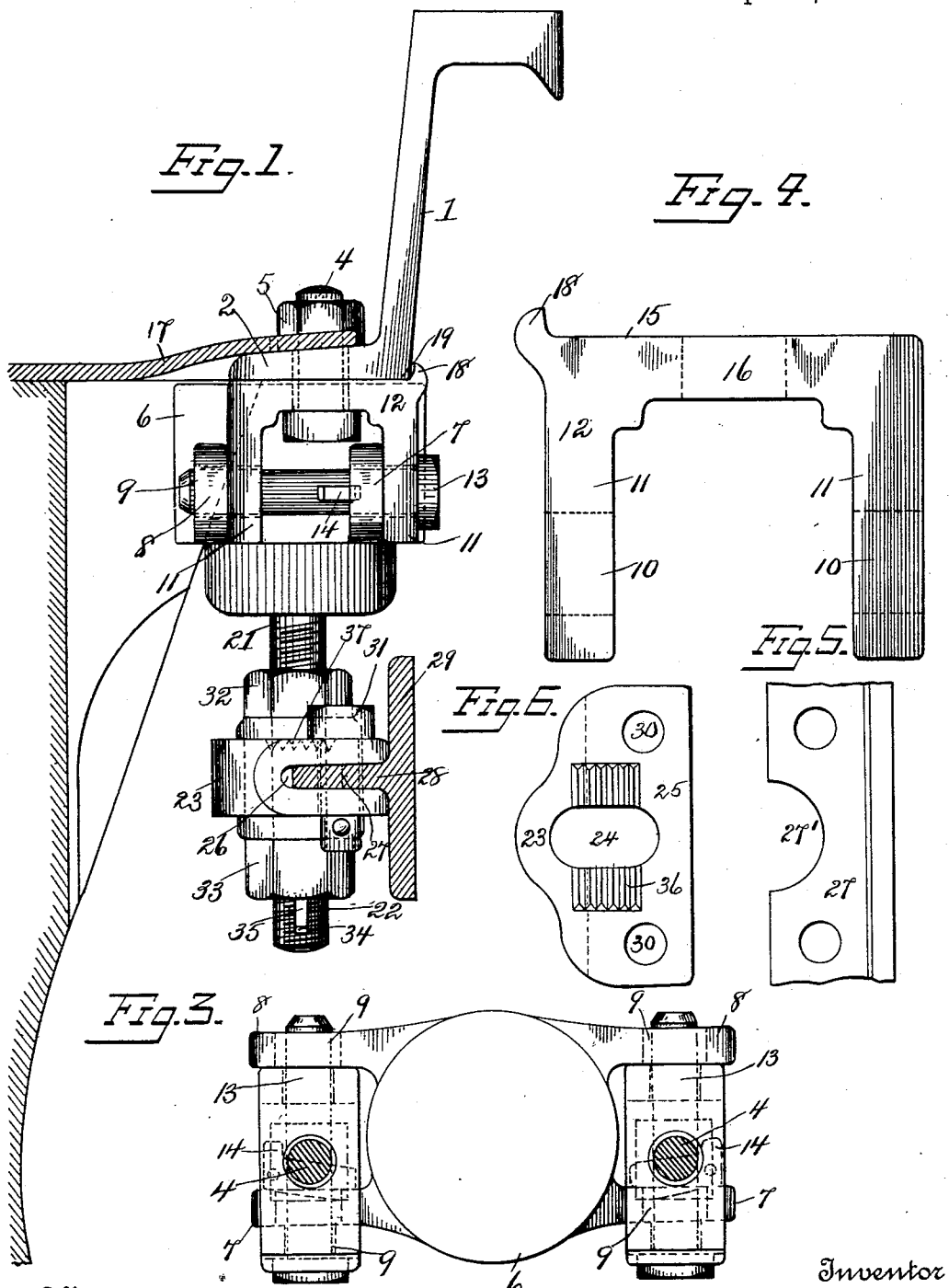

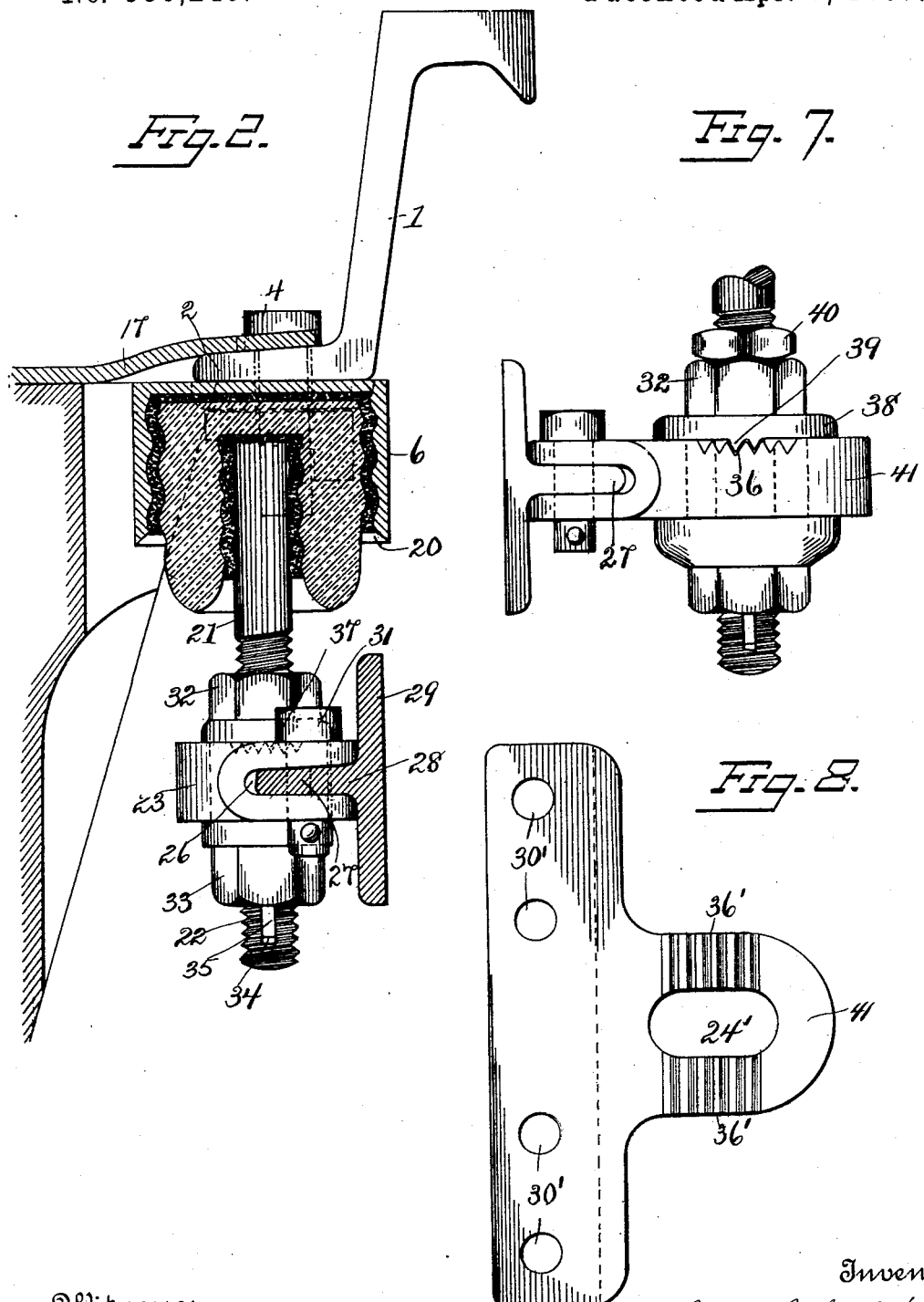

UNITED STATES PATENT OFFICE.

ARTHUR O. BABENDREIER, OF WASHINGTON, DISTRICT OF COLUMBIA, ASSIGNOR TO THE METROPOLITAN RAILROAD COMPANY, OF THE DISTRICT OF COLUMBIA.

CONDUIT SYSTEM FOR ELECTRIC RAILWAYS.

SPECIFICATION forming part of Letters Patent No. 580,246, dated April 6, 1897.

Application filed October 26, 1896. Serial No. 610,162. (No model.)

*To all whom it may concern:*

Be it known that I, ARTHUR O. BABENDREIER, a citizen of the United States, residing at Washington, in the District of Columbia, have invented certain new and useful Improvements in Conduit Systems for Electric Railways; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to conduit systems for electric railways; and its object is to provide improved means for supporting the main conductors within the conduit and for permitting their adjustment vertically, laterally, and longitudinally.

The characteristic features of my invention will be fully described hereinafter and defined in the appended claims.

In the accompanying drawings, Figure 1 is a transverse section of a portion of a railway-conduit with my improved supporting and adjusting mechanism illustrated in elevation. Fig. 2 is a similar view showing the insulator and its casing in vertical section. Fig. 3 is a plan view of the insulator-support with its vertical securing-bolts in horizontal section. Fig. 4 is a side elevation of one of the brackets for securing the insulator-case, detached. Fig. 5 is a plan view of a portion of the conductor-rail, showing a recessed portion adapted to partly encircle the threaded supporting-rod. Fig. 6 illustrates a plan view of the bracket for supporting the conductor-rail. Fig. 7 illustrates in side elevation a modified form of adjusting devices, and Fig. 8 is a plan view of a slightly-modified form of bracket which supports the main conductor-rail.

The reference-numeral 1 designates one section of the slot-rail, having the usual base-flange 2, and adapted to coöperate with a similar rail-section (not shown) to form the central track-slot, through which a suitable traveling contact or plow extends.

The insulator-case and the supporting and adjusting devices for the conductor-rail may be secured within the conduit upon any suitable support, but I preferably secure them to the under side of the flange 2 of the slot-rail, as shown in the drawings, by means of vertical bolts 4 and nuts 5.

The insulator-case 6 is shown as of circular form, and it is provided at opposite sides with parallel lugs or ears 7 and 8, formed with bolt-holes 9, which register with similar openings 10, formed in the depending sides 11 of angular brackets 12, one of which is arranged at each end of the casing 6. As clearly shown in Fig. 1, the depending sides or ends 12 of these brackets overlap the lugs 7 and 8 and are secured thereto by transverse bolts 13. Each of the bolts 13 is transversely slotted to receive a wedge-key 14, which serves to lock the bolts in place. The horizontal portion 15 of each of the brackets 12 is provided with a bolt-hole 16, through which the bolts 4 pass. Said bolts 4 also extend through suitable openings formed in the flange 2 of the slot-rail and are provided with the nuts 5.

A paving-plate 17 bears at one side on the slot-rail flange and at the other side on the wall of the conduit and serves to cover the recess in said wall to allow for the insulator.

The outer edge of each of the angular brackets 12 is provided with an upwardly-projecting lip or flange 18 to engage the shoulder 19 of the slot-rail, thus serving to bring the bolt-holes 10 into proper alinement and at right angles to the said shoulder 19 of the rail.

The several bolt-holes 10 and 16 of the angle-brackets 12, as well as those of the lugs 7 and 8, are enlarged or elongated to facilitate the adjustment of the casing 6.

It will be obvious from the description thus far that the brackets 12 are firmly secured to the flange of the rail 1 by the bolts 4 and that the casing is supported adjustably by the transverse bolts 13.

The inner face of the lower edge 20 of the casing 6 is beveled, as shown in Fig. 2, to deflect water or moisture away from the interior of the casing.

21 designates a rod or bolt having its upper portion embedded in any suitable insulating material within the casing 6 and its lower portion provided with screw-threads 22. Upon this threaded rod 21 is arranged a bracket 23, having an elongated opening 24, through which the rod 21 passes. The projecting portion 25 of the bracket 23 is lengthened longitudinally in the direction of the length of the conductor and is provided with a longitudinal slot 26, extending to the point shown by dotted lines, Fig. 6, serving as a seat to receive the web or lateral flange 27 of the conductor 28, which latter is recessed at 27', as shown in Fig. 5, so as to partially surround rod 21 and to allow for lateral adjustment of bracket 23 upon rod 21 by virtue of the elongated opening 24, the vertical face 29 of the conductor serving to receive the traveling contact or plow. A suitable number of bolt-holes 30 are formed in the slotted projecting portion of the bracket 23 to receive bolts 31 for securing the brackets to the flange 27 of the conductor.

The bracket 23 is secured adjustably upon the rod 21 by nuts 32 and 33, arranged one above and the other below the bracket, and the lower portion of the rod 21 is formed with an opening 34 to receive a wedge-key 35 below the lower nut 33 to lock the latter against downward movement.

It will be apparent that the elongated opening 24 in the bracket 23 permits a lateral or horizontal adjustment of said bracket and the conductor secured thereto upon the rod 21. To lock the bracket firmly in any position to which it may be adjusted is an important consideration, and such locking has heretofore been effected by the insertion of a wedge or key between the bracket and rod. To avoid the use of this locking-key, I have devised the locking device which will now be described and which constitutes a distinguishing feature of my invention.

The bracket 23 is provided with a series of teeth or serrations 36, (clearly shown in Fig. 6,) adapted to engage corresponding teeth or serrations 37, as shown by dotted lines, Figs. 1 and 2, on one of the nuts 32 or 33 or on an interposed washer arranged on the rod 21. I have shown these teeth 36 on the upper face of the bracket 23 and the coöperating teeth 37 projecting from the under face of the upper nut 32, but it is obvious that the teeth 36 might be formed on the under face of the bracket 23 and the teeth 37 on the upper face of the lower nut 33 with like effect. Again, instead of forming the teeth 37 on one of the nuts 32 or 33 I may, as illustrated in the modification in Fig. 7, employ a washer 38, having teeth 39, and interpose said washer between the nut 32 and the bracket 41. In this instance I prefer to employ an additional lock-nut 40 above the nut 32.

By reference to the modification illustrated in Fig. 8 I have shown the teeth or serrations 36' as extending entirely across the width of the bracket 41 beyond the elongated opening 24', and said bracket is extended somewhat and so slotted as to dispense with the recess in the conductor-rail, as shown in Fig. 5, and is provided with a series of bolt-holes 30'.

By loosening the lower nut 33 the bracket may be adjusted laterally, and the engagement of the teeth 36 and 37 will sustain the bracket firmly in its adjusted position after the nut 33 is again locked in place by the key 35.

The vertical adjustment of the bracket is effected, as will be readily understood, by turning the nuts 32 and 33 upon the threaded rod 21.

It is obvious that the slotted bolts 13 may be provided with nuts instead of the wedge-keys and the slot thus dispensed with. It is also obvious that the bracket-bolts 4 may be riveted and elongated and provided with a slot to receive a wedge-key to support the insulator-case, as shown by dotted lines, Fig. 2, and thus dispense with the brackets 12 and bolts 13. In the latter event the insulator-case should be provided with a horizontal flange at each end instead of the ears 7 and 8.

Having thus described my invention, what I desire to claim and secure by Letters Patent is—

1. In an electric-railway conduit system, an insulator-support comprising a casing provided with outwardly-projecting lugs at each end thereof, brackets fixedly secured to said lugs, and means for supporting said brackets within the conduit.

2. In an electric-railway conduit system, an insulator-support comprising a casing provided with projecting perforated end lugs, brackets having depending ends secured to said end lugs, and means for securing the brackets within the conduit, and for bracing them to the slot-rail.

3. In an electric-railway conduit system, an insulator-support comprising a casing provided with a pair of parallel lugs at opposite sides thereof, brackets at opposite ends of the casing, each consisting of a horizontal body portion and depending ends, means for securing the brackets within the conduit, and to the casing, and a lip or flange projecting from each of said brackets.

4. In an electric-railway conduit system, a conductor-support comprising a vertically-arranged screw-threaded rod, a bracket on said rod, said bracket having vertical and lateral adjustment thereon and provided with a horizontal seat or slot to receive the flange of the conductor, means on said rod for regulating the vertical adjustment of the bracket, said means having teeth or serrations and coöperating teeth or serrations on the bracket for maintaining its lateral adjustments.

5. In an electric conduit system, a conductor-support comprising a vertically-arranged screw-threaded rod, a bracket on said rod having an elongated opening through which the rod passes, and the longitudinal slot or seat to receive the lateral web or flange of the conductor, means on said rod for regulating the vertical adjustment of the bracket, said means having teeth or serrations and serrations or teeth on the bracket coöperating therewith for locking the bracket in its lateral adjustments.

6. The combination with the vertically-arranged screw-threaded rod, of a bracket arranged thereon and provided with an elongated opening through which the rod extends, a longitudinal seat in said bracket to receive the flange of the conductor, means for securing the flange in said seat, clamping-nuts on said rod, serrations or teeth on said bracket, corresponding teeth on one of the said nuts, and a key fitting a transverse slot in the lower portion of the threaded rod.

7. In an electric-railway conduit system, a conductor-support comprising a vertically-arranged screw-threaded rod, a bracket on said rod, said bracket having a slot or seat to receive the flange of the conductor, clamping devices on said rod, teeth or serrations on the upper clamping device, and teeth or serrations on the upper surface of the bracket and adapted to coöperate with the clamping devices for locking the bracket in its lateral adjustments.

In testimony whereof I affix my signature in presence of two witnesses.

ARTHUR O. BABENDREIER.

Witnesses:
JOS. H. BLACKWOOD,
ALBERT POPKINS.